US006756442B2

(12) United States Patent
Stark et al.

(10) Patent No.: US 6,756,442 B2
(45) Date of Patent: Jun. 29, 2004

(54) SILANE-MODIFIED POLYVINYL ACETALS

(75) Inventors: Kurt Stark, Burgkirchen (DE);
Thomas Kornek, Burghausen (DE);
Bernhard Glaser, Woerth (DE);
Karl-Heinz Eichel, Burghausen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 0 days.

(21) Appl. No.: 10/217,558

(22) Filed: Aug. 13, 2002

(65) Prior Publication Data
US 2003/0045633 A1 Mar. 6, 2003

(30) Foreign Application Priority Data
Aug. 16, 2001 (DE) .......................... 101 40 129

(51) Int. Cl.$^7$ .................................................. C08F 8/28
(52) U.S. Cl. ............................ 525/61; 525/60; 525/62; 525/342
(58) Field of Search ............................ 525/61, 60, 62, 525/342

(56) References Cited

U.S. PATENT DOCUMENTS

| 2,528,337 A | * | 10/1950 | Buckley | 524/81 |
| 2,746,945 A | * | 5/1956 | Buckley | 524/352 |
| 3,252,825 A | * | 5/1966 | Marzocchi et al. | 428/367 |
| 3,959,242 A | * | 5/1976 | Watts et al. | 525/56 |
| 4,179,537 A | * | 12/1979 | Rykowski | 427/387 |
| 4,544,724 A | * | 10/1985 | Sogah et al. | 526/279 |
| 4,663,228 A | | 5/1987 | Bolton et al. | |

FOREIGN PATENT DOCUMENTS

| DE | 196 41 064 A1 | 4/1998 |
| EP | 0 368 832 A2 | 5/1990 |
| EP | 0 461 399 A2 | 12/1991 |
| EP | 0 634 447 A1 | 1/1995 |
| EP | 1 055 686 A1 | 11/2000 |
| EP | 0 636 471 B1 | 3/2001 |
| JP | 62-181305 | 8/1987 |
| JP | 6-247760 | 9/1994 |
| JP | 6-248247 | 9/1994 |
| JP | 10237259 | * 8/1998 |
| JP | 10-237259 | 8/1998 |

OTHER PUBLICATIONS

Derwent Abstract Corresponding To EP 634 447 [AN 1995–045145].
Derwent Abstract Corresponding To EP 1 055 686 [AN 2000–482991].
Derwent Abstract Corresponding To DE 196 41 064 [1998–218181].
Derwent Abstract Corresponding To JP 06–247760 [AN 1994–322007].
Derwent Abstract Corresponding To JP 06–248247 [AN 1994–322402].
Derwent Abstract Corresponding To JP 10–237259 [AN 1998–537617].
Derwent Abstract Corresponding To JP 62–181305 [AN 1987–260949].
Plueddemann, "Bonding Through Coupling Agents", Plenum Press, New York, 1985.

* cited by examiner

Primary Examiner—Judy M. Reddick
(74) Attorney, Agent, or Firm—Brooks Kushman P.C.

(57) ABSTRACT

The invention relates to silane-modified polyvinyl acetals obtained by acetalizing partially hydrolyzed or fully hydrolyzed vinyl ester polymers having at least 50 mol % of vinyl alcohol units with one or more aldehydes, optionally in the form of their hemiacetals or their acetals, where at least one aldehyde contains hydrolyzable silane groups.

9 Claims, No Drawings

SILANE-MODIFIED POLYVINYL ACETALS

BACKGROUND OF THE INVENTION

1. Field of the Invention

The invention relates to silane-modified polyvinyl acetals, to a process for their preparation, and to their use.

2. Background Art

The preparation of polyvinyl acetals obtained from the corresponding polyvinyl alcohols by polymer-analogous reaction with appropriate aldehydes, was disclosed as early as 1924. Since then, aldehydes in wide variety have been used for preparing the corresponding polyvinyl acetals. Polyvinyl acetals are prepared in a 3-stage process in which polyvinyl acetate is first prepared and then hydrolyzed to the corresponding polyvinyl alcohol, which is then acetalized to form the polyvinyl acetal. The resultant products contain residual vinyl alcohol and vinyl acetate units as well as the vinyl acetal groups. Polyvinyl formal, polyvinyl acetacetal, and polyvinyl butyral (PVB) have achieved particular commercial importance. The term "modified polyvinyl acetals" hereinafter means polyvinyl acetals which contain other monomer-derived units in addition to vinyl acetate, vinyl alcohol, and vinyl acetal units.

The largest application sector for polyvinyl acetals is the production of safety glass in automotive construction and for architectural uses, plasticized polyvinyl butyral films being used as an intermediate layer in glazing units. Blends with modified polyvinyl butyral have also been proposed for this purpose, for example those having the acetal units described in EP-A 368832, bearing sulfonate, carboxylate, or phosphate functionality, which are said to improve blocking and flow performance. EP-A 634447 discloses modified polyvinyl butyrals whose main polymer chain contains monomer units which have sulfonate groups, these polyvinyl butyrals being obtainable via acetalization of polyvinyl alcohols having sulfonate functionality.

In EP-A 461399, polyvinyl butyrals modified with amino groups are disclosed. The latter polymers are used as precipitants. Another application sector for polyvinyl butyrals is their use in anti-corrosion coatings, as disclosed in EP-A 1055686, for example, where of polyvinyl acetals modified with tertiary alkanolamines are used for this purpose.

High pigment binding power makes polyvinyl butyrals eminently suitable as binders in paints, and particularly in printing inks. In printing inks, a further requirement is that organic solutions of the polyvinyl butyrals should have very low solution viscosity, in order to permit their use for producing inks with high solids content while using a very high binder content. Examples of polyvinyl butyrals having low solution viscosity include the modified polyvinyl butyrals disclosed in DE-A 19641064, obtained by acetalizing a copolymer having vinyl alcohol units and 1-alkylvinyl alcohol units.

A disadvantage possessed by all of the polyvinyl acetals described in the prior art is their inadequate adhesion to specific substrates. For this reason, the addition of coupling agents is essential in many cases. EP-B 0346768 describes the coating of films or foils with amino functional silanes such as N-(2-aminoethyl)-3-aminopropyltrimethoxysilane, in order to improve bonding to other polymers, in particular to polyvinyl butyrals. In the case of polyethylene and polyester films, vinyltrimethoxysilanes or chloropropyltrimethoxysilanes have been used as adhesion promoters, providing successful lamination using hot-melt adhesives based on ethylene-vinyl acetate copolymers (E. Plueddemann, BONDING THROUGH COUPLING AGENTS, Plenum Press, New York, 1985). Primer coats of N-(2-aminoethyl)-3-aminopropyltrimethoxysilane have been employed for improving the adhesion of an ionic resin, i.e. a salt of a polymer based on ethylene-methacrylic acid, to glass or polycarbonate films, as disclosed in U.S. Pat. No. 4,663,228. EP-B 0636471 claims a process for producing a glass composite, where adhesion between glass and polymer film, i.e. polyvinyl butyral, is improved by using a mixture of two or more silanes. One of the silanes is employed to increase the bond strength between the glass and the polymer film, while the other silane adhesion promoter is not selected for providing bonding between glass and polymer film.

The processes described in the prior art for improving adhesion between polyvinyl acetals and critical substrates by adding known coupling agents have clear disadvantages. For example, the adhesion-promoting action is often not sufficiently long lasting, or the composite weakens over time. Other disadvantages include yellowing of aminosilanes and their unpleasant odor and skin-irritant action, a known problem when using amino-functional compounds. Another problem lies in the actual mode of addition of the coupling agents, which always requires an additional, time-consuming step in the mixing procedure. The selection and addition of suitable coupling agents furthermore requires great expertise. For example, when the adhesion promoter is added to a polyvinyl acetal in organic solvent, the result can be incompatibility and inhomogeneity, in some cases to such a degree that phase separation may occur. In addition, the reactive silanes subsequently added as coupling agent may become involved in side reactions such as hydrolysis or condensation reactions. Another disadvantage consists in the large amount of adhesion promoter which generally must be added in order to substantially improve adhesion of polyvinyl acetals on critical substrates. The process can therefore become very expensive, since the cost of silanes is relatively high.

Four Japanese publications have disclosed silane-modified polyvinyl acetals. JP-A 06-247760 and JP-A 06-248247 disclose polyvinyl acetals modified with silane-functional monomer units for use as binders for cementitious compositions or for inorganic fiber materials. These Si-modified polyvinyl acetals are obtained by copolymerizing vinyl acetate with vinylalkoxysilanes, hydrolyzing the vinyl ester-vinylsilane copolymers, and finally acetalizing with aldehyde. JP-A 10-237259 proposes a mixture of silane-modified polyvinyl acetal and unmodified polyvinyl acetal for coating materials capable of being printed using ink-jet printers. In the latter reference, vinyl ester-vinylsilane copolymers are first hydrolyzed, are then mixed with unmodified polyvinyl alcohol, and finally acetalized with aldehyde. A disadvantage with the procedures found in these publications is that the result is always an inhomogeneous polymer in which pure polyvinyl acetal chains are present alongside polyvinyl acetal chains modified with silanol groups, which leads to incompatibility. The enrichment of silanol groups in the silane-modified polyvinyl acetal chains also increases the extent of condensation, which is undesired, and thus causes gelling. Only strongly alkaline systems, e.g. cementitious compositions, are capable of breaking down this gel to some extent, but in neutral organic solvents the inhomogeneity and the gel continue to be present, visible as marked phase separation, which is disadvantageous.

Finally, JP-A 62-181305 discloses a polyvinyl butyral modified with triethoxyisocyanatopropylsilane. Here, a polymer-analogous reaction is used to link the alkoxysilane group to the polymer skeleton via a urethane bond through reaction of the isocyanate group of the silane with free hydroxyl groups on the polyvinyl butyral. An associated disadvantage is that a reaction of this type is impossible in solvents containing hydroxyl groups, for example water and alcohols, since in such cases the isocyanate functions are hydrolyzed quantitatively with elimination of carbon dioxide to give the corresponding unreactive aminosilane.

SUMMARY OF THE INVENTION

An object of the present invention was to provide polyvinyl acetals which intrinsically have very good adhesion to various substrates and in particular to the known critical substrates, making it unnecessary to add any coupling agent at all. It has been surprisingly discovered that polyvinyl acetals obtained from polyvinyl alcohols via polymer-analogous reaction with aldehydes, where at least one aldehyde, optionally present in the form of its hemiacetal or acetal, contains hydrolyzable silane groups, have markedly improved adhesion to critical substrates, to the extent that it is indeed possible to omit the use of coupling agent. There is also a great improvement in adhesion to glass or metals. The adhesion-improving effect of these modified polyvinyl acetals begins to occur even at a very low content of alkoxysilane, alkoxysiloxane, and/or silanol groups.

DETAILED DESCRIPTION OF THE PREFERRED EMBODIMENTS

The invention provides silane-modified polyvinyl acetals obtainable by acetalizing partially hydrolyzed or fully hydrolyzed vinyl ester polymers having $\geq 50$ mol % of vinyl alcohol units with one or more aldehydes, where appropriate in the form of their respective hemiacetals or acetals, where at least one aldehyde contains hydrolyzable silane groups.

Suitable partially hydrolyzed or fully hydrolyzed vinyl ester polymers may be derived from polymers which contain from 50 to 100 mol % of vinyl ester units. Suitable vinyl esters are vinyl esters of unbranched or branched carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 5 to 11 carbon atoms, such as VeoVa9$^R$ or VeoVa10$^R$ (trade names of Shell). Vinyl acetate is particularly preferred.

Besides the vinyl ester units, one or more comonomers preferably selected from among methacrylates and acrylates ("(meth)acrylates") of alcohols having from 1 to 15 carbon atoms, olefins, dienes, vinylaromatics, and vinyl halides may also be present in the polymer where appropriate. Suitable (meth)acrylic acid monomers include esters of optionally branched alcohols having from 1 to 15 carbon atoms. Preferred (meth)acrylates are methyl acrylate, methyl methacrylate, ethyl acrylate, ethyl methacrylate, propyl acrylate, propyl methacrylate, n-butyl acrylate, isobutyl acrylate, tert-butyl acrylate, n-butyl methacrylate, isobutyl methacrylate, tert-butyl methacrylate, 2-ethylhexyl acrylate, and norbornyl acrylate. Particular preference is given to methyl acrylate, methyl methacrylate, n-butyl acrylate, isobutyl acrylate, tert-butyl acrylate, 2-ethylhexyl acrylate, and norbornyl acrylate. Suitable dienes include 1,3-butadiene and isoprene. Examples of polymerizable monoolefins include ethene and propene. Vinylaromatic comonomers which may be used include styrene and vinyltoluene. With respect to the vinyl halides, use is usually made of vinyl chloride, vinylidene chloride, or vinyl fluoride, preferably vinyl chloride. The proportion of these comonomers is such that the proportion of vinyl ester monomer in the vinyl ester polymer is $\geq 50$ mol %.

Where appropriate, additional comonomers may also be present, their proportion preferably being from 0.02 to 20% by weight, based on the total weight of the vinyl ester polymer. Examples of these are ethylenically unsaturated mono- or dicarboxylic acids, preferably acrylic acid, methacrylic acid, fumaric acid, or maleic acid; ethylenically unsaturated carboxamides and ethylenically unsaturated carbonitriles, preferably N-vinylformamide, acrylamide, or acrylonitrile; mono- or diesters of fumaric acid or maleic acid such as their diethyl or diisopropyl esters; also maleic anhydride; ethylenically unsaturated sulfonic acids, and their salts, preferably vinylsulfonic acid and 2-acrylamido-2-methylpropanesulfonic acid. Other examples of additional monomers include precrosslinking monomers, such as comonomers with ethylenic polyunsaturation, e.g. divinyl adipate, diallyl maleate, allyl methacrylate, butanediol diacrylate, and triallyl cyanurate, and post-crosslinking comonomers, such as acrylamidoglycolic acid (AGA), methyl methacrylamidoglycolate (MAGME), N-methylolacrylamide (NMA), N-methylolmethacrylamide, allyl N-methylolcarbamate; and alkyl ether and esters of N-methylolacrylamide, of N-methylolmethacrylamide, or allyl N-methylolcarbamate, for example their isobutoxy ethers.

The vinyl ester polymers are available commercially or may be prepared in a known manner by polymerization, preferably by bulk polymerization, suspension polymerization, or polymerization in organic solvents, more preferably in alcoholic solution. Examples of suitable solvents and regulators (chain transfer agents) are methanol, ethanol, propanol, and isopropanol. The polymerization is typically carried out at reflux at a temperature of from 55 to 100° C., and is initiated by adding the free-radical initiators conventionally used. Examples of currently used initiators include percarbonates such as cyclohexyl peroxydicarbonate, and peresters such as tert-butyl perneodecanoate and tert-butyl perpivalate. The molecular weight may be adjusted in a known manner via addition of regulator, via the solvent content, by variation of the initiator concentration, and by variation of the temperature. Once the polymerization has ended, the solvent is removed by distillation, as are also excess monomer and regulator where appropriate.

The vinyl ester polymers are hydrolyzed in a manner known per se, for example by the belt process or kneader process, in an alkaline or acidic medium, with addition of acid or base. It is preferable for the solid vinyl ester polymer to be taken up or supplied in alcohol, e.g. methanol, the solids content being adjusted to 15–70% by weight. The hydrolysis is preferably carried out in a basic medium, for example by adding NaOH, KOH, or NaOCH$_3$. The amount of base used is generally from 1 to 5 mol % per mole of ester units. The hydrolysis is carried out at temperatures of from 30 to 70° C. Once the hydrolysis has ended, the solvent is removed by distillation and the polyvinyl alcohol is obtained as a powder. However, it is also possible for the polyvinyl alcohol to be obtained in the form of an aqueous solution by successive addition of water during distillative removal of solvent.

The term "fully hydrolyzed vinyl ester polymer" is used to describe polymers whose degree of hydrolysis is greater than or equal to 96 mol %. Partially hydrolyzed polyvinyl esters are those with a degree of hydrolysis greater than or equal to 50 mol % and less than 96 mol %. The partially hydrolyzed or fully hydrolyzed vinyl ester polymers preferably have a degree of hydrolysis of from 50 to 99.9 mol %, more preferably from 70 to 99.9 mol %, and most preferably from 90 to 99.9 mol %. The viscosity of the polyvinyl alcohol measured in accordance with DIN 53015, Höppler method; 4% by weight solution in water, is from 1 to 30 mPas, preferably from 1 to 6 mPas, and is a measure of the molecular weight and of the degree of polymerization of the partially hydrolyzed or fully hydrolyzed silanized vinyl ester polymers. The degree of polymerization of the polyvinyl alcohol used is at least 130.

Suitable silane-containing aldehydes, or their hydrates, their hemiacetals, or their acetals, may be given by the following structural formulae I and II:

I) $(R^2)_3Si$—$[OSi(R^2)_2]_Y$—$(CH_2)_X$—$CH(OR^1)_2$, an acetal, hemiacetal, or aldehyde hydrate, II) $(R^2)_3Si$—$[OSi(R^2)_2]_Y$—$(CH_2)_X$—$CH=O$, a free aldehyde, where $R^1$ are identical or different and are a hydrogen atom or an unbranched or branched, saturated or unsaturated, unsubstituted or substituted alkyl radical having from 1 to 12 carbon atoms which may, where appropriate, be interrupted by N, O, or S heteroatoms, and $R^2$ are identical or different and are a radical selected from the group consisting of halogen, preferably Cl or Br, unbranched or branched, saturated or unsaturated, unsubstituted or substituted alkyl and alkoxy radicals having from 1 to 12 carbon atoms, preferably from 1 to 3 carbon atoms, and acyl radicals having from 2 to 12 carbon atoms, where $R^2$ may, where appropriate, also be interrupted by N, O, or S heteroatoms. One or more radicals $R^2$ may be hydrolyzed to form a free silanol group Si—OH. X is a number from 2 to 40, and Y is a number from 0 to 100, preferably a number from 0 to 10.

Preferred silane-containing aldehydes or their hemiacetals or acetals of the structural formulae I and II are 3,3-diethoxypropyltriethoxysilane, 3,3-dimethoxypropyltriethoxysilane, 3,3-diethoxypropyltrimethoxysilane, 3,3-dimethoxypropyltrimethoxysilane, 3,3-diethoxypropylmethyldiethoxysilane, 3,3-diethoxypropyldimethylethoxysilane, 3,3-dimethoxypropyltripropoxysilane, 3,3-dimethoxypropyltriisopropoxysilane, 3,3-dipropoxypropyltriethoxysilane, 3,3-diethoxypropylmethyldimethoxysilane, 3,3-diethoxypropyldimethylmethoxysilane, 3,3-dimethoxypropylmethyldimethoxysilane, 3,3-dimethoxypropyldimethylmethoxysilane, 3,3-dimethoxypropylmethyldiethoxysilane, 3-(trimethoxysilyl) propionaldehyde, 3-(triethoxysilyl)propionaldehyde, and 4-(trimethoxysilyl)butyraldehyde.

The silane-containing aldehydes or their hemiacetals or acetals of the structural formulae I and II may be used on their own or in mixtures with other aldehydes, with the aim of obtaining a modified polyvinyl acetal having alkoxysilane groups or alkoxysiloxane groups, and/or free silanol groups. Suitable silane-free aldehydes include those selected from among aliphatic and aromatic aldehydes having from 1 to 15 carbon atoms, their hemiacetals and acetals. Preference is given to formaldehyde, acetaldehyde, propionaldehyde, and benzaldehyde. Particular preference is given to butyraldehyde and a mixture of butyraldehyde and acetaldehyde.

The silane-modified polyvinyl acetals have a silicon content of from 0.002 to 10% by weight, preferably from 0.005 to 5% by weight, more preferably from 0.01 to 3% by weight, and most preferably from 0.02 to 1% by weight, based on the total weight of the silane-modified polyvinyl acetal. Silane-modified polyvinyl acetals whose silicon content is from 0.1 to 10% by weight have a high content of free silanol groups or of hydrolyzable alkoxysilane groups or of hydrolyzable alkoxysiloxane groups, and can therefore be crosslinked using the crosslinking catalysts usually used for silanol groups, alkoxysilane groups, or alkoxysiloxane groups.

The degree of acetalization of the silane-modified polyvinyl acetals is from 1 to 80 mol %, preferably in the ranges of from 1 to 20 mol % and from 45 to 80 mol %. The viscosity of the modified polyvinyl acetals as measured in accordance with DIN 53015, Höppler method, 10% by weight solution in ethanol, is from 4 to 1,200 mPas, preferably from 4 to 80 mPas. However, ethanolic solutions of the polyvinyl acetal of the invention with ca. 10 weight percent or more may become gelled to a greater or lesser extent depending on the silane content, via crosslinking of the silanol groups. In such cases, the viscosity then becomes markedly greater than 1,200 mPas.

Aqueous suspensions of the silane-modified polyvinyl acetals may be stabilized by anionic, zwitterionic, cationic, or non-ionic emulsifiers, or by protective colloids. It is preferable to use zwitterionic or anionic emulsifiers, where appropriate, and also mixtures thereof. Preferred non-ionic emulsifiers include condensation products of ethylene oxide or propylene oxide with linear or branched alcohols having from 8 to 18 carbon atoms, with alkylphenols, or with linear or branched carboxylic acids having from 8 to 18 carbon atoms, and also include block copolymers of ethylene oxide and propylene oxide. Examples of suitable anionic emulsifiers are alkyl sulfates, alkylsulfonates, alkyl aryl sulfates, and sulfates or phosphates of condensation products of ethylene oxide with linear or branched alkyl alcohols or with alkylphenols with from 2 to 25 EO units and mono- or diesters of sulfosuccinic acid. Examples of suitable zwitterionic emulsifiers are alkyldimethylamine oxides, the alkyl chain having from 6 to 16 carbon atoms. Examples of cationic emulsifiers which may be used are tetraalkylammonium halides, such as $C_6$–$C_{16}$-alkyltrimethylammonium bromide. It is also possible to use trialkylamines having one relatively long, for example, 5 carbon atoms or more and two relatively short hydrocarbon radicals having less than 5 carbon atoms, these being present in protonated form during the course of the acetalization, which proceeds under strongly acidic conditions, and being capable of acting as an emulsifier. The amount of emulsifier is from 0.01 to 20% by weight, based on the total weight of the modified polyvinyl acetal in the original solution. Preference is given to amounts of from 0.01 to 2% by weight of emulsifier, and a particularly preferred amount of emulsifier is from 0.01 to 1% by weight, based on the silane-modified polyvinyl acetal.

For the acetalization, the partially or fully hydrolyzed polyvinyl esters are preferably taken up in an aqueous medium. The solids content of the aqueous solution is usually adjusted to 5–30%. The acetalization takes place in the presence of acidic catalysts, such as hydrochloric acid, sulfuric acid, nitric acid, or phosphoric acid. The pH of the solution is preferably adjusted to values less than 1 by adding 20% strength hydrochloric acid.

After addition of the catalyst, the solution is cooled, preferably within the range of –10 to +30° C. In general, the lower the molecular weight of the modified polyvinyl alcohol used, the lower is the selected precipitation temperature. The acetalization reaction is initiated by adding the aldehyde(s), and at least one silane-containing aldehyde or its hemiacetal or acetal. The amount added depends on the desired degree of acetalization. Since the acetalization proceeds to almost complete conversion, the amount added may be determined by simple stoichiometric calculation. If use is made of a mixture made from silane-containing aldehyde and non-silane-containing aldehyde, the ratio of the aldehydes can be found from the silicon content to be achieved in the modified polyvinyl acetal, the desired degree of acetalization, and the molecular weight of the aldehydes, in particular of the silane-containing aldehyde. After aldehyde addition has ended, the acetalization is completed by heating the mixture to 20–60° C. and stirring for a number of hours, preferably from 1 to 6 hours, and the pulverulent reaction product is isolated by filtration and then washing. Further alkali may be added for stabilization. During the precipitation and the post-treatment use may be made of emulsifiers in order to stabilize the aqueous suspension of the silane-containing polyvinyl acetal. It should be noted that the term "hemacetal or acetal" also includes the related hydrates herein.

In one particularly preferred process, one or more silane-containing aldehydes or their hemiacetal or acetal are first added to the aqueous solution of the polyvinyl alcohol, preferably at a temperature above the precipitation temperature. A small amount of catalyst, such as hydrochloric acid, is used to adjust to a pH of from 2 to 5, preferably from 4 to 5, so that the silane-containing aldehydes can enter into prior reaction with the polyvinyl alcohol, and then, where appropriate after addition of one or more non-silane-containing aldehydes, the temperature is adjusted to the precipitation temperature. The precipitation of the modified polyvinyl acetal is then brought about by adding the remaining catalyst. The work-up process described above then takes place.

The procedure of the invention gives access to modified polyvinyl acetals which have markedly better adhesion to critical substrates than previously known polyvinyl acetals, making it unnecessary to add coupling agent(s).

The modified polyvinyl acetals, as previously mentioned, are particularly useful in the printing ink industry for binders with very good adhesion to various flexible polymeric films, and for providing printing inks which once applied have very firm bonding to the substrate and are therefore very difficult to remove from the printed substrate. The excellent adhesion of the silane-modified polyvinyl acetals, in particular polyvinyl butyrals or mixed polyvinyl acetals, make these particularly suitable for use in printing ink formulations.

Suitable printing ink formulations are known to the skilled worker and generally comprise from 5 to 20% by weight of pigment, such as diazo pigments or phthalocyanine pigments, from 5 to 15% by weight of polyvinyl acetal binder, and solvent, for example alcohols such as ethanol, or esters such as ethyl acetate. Where appropriate, other additives may also be present, such as inhibitors, plasticizers, and other added materials such as fillers or waxes. It is no longer essential to use coupling agent.

The silane-modified polyvinyl acetals also have very good suitability for laminated safety glass and glass composites, and high-performance safety glass and glazing films, since it is possible to achieve higher tensile stress at break as well as a further improvement in adhesion to glass. In these applications, the use of other polymer films, such as PET films, is also to be recommended, since the silane-modified polyvinyl acetals and the films produced from them have very good adhesion not only to the glass surface but also to the surface of these other polymer films, making it unnecessary to add coupling agent. The surface roughness may also be adjusted to a desired level by varying the silane content and, where appropriate, crosslinking the silanol groups.

Water-soluble, partially acetalized silane-containing polyvinyl acetals which may also contain ionic groups, such as carboxylate groups or sulfonate groups, may also be used as protective colloids, for example for aqueous dispersions or during polymerization in an aqueous medium, or during the production of water-redispersible dispersion powders. Preference is given here to silane-containing and water-soluble polyvinyl acetals, for example those having a solubility of more than 10 g/l in water under standard conditions of temperature and pressure, with a degree of acetalization of 1 to 20 mol %, in particular from 3 to 16 mol %. In the case of dispersions intended for coatings and based on polymer dispersions stabilized using the silane-modified polyvinyl acetals, the result can be a considerable improvement in wet abrasion resistance in comparison with polymer dispersions using conventional protective colloids, since the silane-modified polyvinyl acetals also improve pigment binding, in both carbonate-rich and silicate-rich formulations.

The silane-modified polyvinyl acetals may also be used in water-based paints. Higher silane contents in the silane-modified polyvinyl acetals render the latter capable of crosslinking, for example by moisture or by added catalysts. The polymers containing crosslinkable silane groups open up further application sectors for their use, for example in powder paints. Other application sectors for the silane-modified polyvinyl acetals include their use as binders in anti-corrosion compositions, where improved adhesion is a significant advantage. The modified polyvinyl acetals are also suitable as binders in the ceramics industry, specifically as binders for green ceramics. Mention should also be made of their use as binders for ceramic powders or metal powders in powder injection molding, or as binders for the internal coating of containers. In all cases, the silane-modified polyvinyl acetals exhibit considerably better adhesion than the polyvinyl acetals known from the prior art.

The examples below provide further illustration of the invention but do not in any way limit its scope:

EXAMPLE 1

2,683 ml distilled water, 1,114 ml of 20% strength HCl and 1,190 ml of a 19.7 weight percent aqueous solution of a grade 03/20 polyvinyl alcohol, viscosity 3.68 mPas (DIN 53015; Höppler method; 4 weight percent aqueous solution) were charged to a 6 liter glass reactor and cooled to −2° C. within a period of one hour, with stirring. A mixture of 180 ml of butyraldehyde and 10.6 ml (10.0 g) of 3,3-diethoxypropyltriethoxysilane, cooled in advance to −4° C., was then added over a period of 5 minutes, with an attendant rise in the internal reactor temperature to −0.7° C. The mixture was cooled again rapidly to −2° C. 3 minutes after addition of butyraldehyde and diethyl acetal of the silane-containing aldehyde, the mixture, which was initially clear, became milky, and the product then precipitated after as little as 5 minutes. After 40 minutes of reaction time at −2° C., the temperature was increased to 25° C. over a period of 3.5 hours, this temperature was maintained for a further 2 hours. The product was then filtered off under suction and washed with distilled water until the filtrate gave a neutral reaction. The moist product was dried to a solids content of at least 98%, initially at 22° C. and then at 35° C. in vacuo, yielding a modified polyvinyl acetal having 18.3% by weight of vinyl alcohol units. The vinyl acetate content was 1.5% by weight. The viscosity (DIN 53015; Höppler method; 10 weight percent ethanolic solution) was 59.5 mPas. The Si content was 0.23% by weight.

EXAMPLE 2

2,700 ml of distilled water and 1,178 ml of a 19.9% weight aqueous solution of a grade 03/20 polyvinyl alcohol, viscosity 3.68 mPas (DIN 53015; Höppler method; 4% by weight aqueous solution) were charged to a 6 liter glass reactor and cooled to 5° C. within a period of one hour, with stirring. 5.3 ml (5.0 g) of 3,3-diethoxypropyltriethoxysilane were then added over a period of 10 minutes. The mixture was adjusted to pH 4.5 using about 10 ml of 20% strength hydrochloric acid and was stirred for 20 min. 185 ml (149.6 g) of butyraldehyde were then added over a period of 5 min. The modified polyvinyl acetal was precipitated by adding 1,104 ml of 20% strength hydrochloric acid, metered in at −2° C. within a period of 45 min. After 40 minutes of reaction time at −2° C., the temperature was increased to 25° C. over a period of 3.5 hours, and this temperature was maintained for a further 2 hours. The product was then isolated by suction filtration and washed with distilled water until the filtrate gave a neutral reaction. The moist product was dried to a solids content of at least 98%, initially at 22° C. and then at 35° C. in vacuo, yielding a modified polyvinyl butyral having 18.8% by weight of vinyl alcohol units. The vinyl acetate content was below 2% by weight. The viscosity (DIN 53015; Höppler method; 10% strength ethanolic solution) was 36.7 mPas. The Si content was determined to be 0.11% by weight.

EXAMPLE 3

2,683 ml of distilled water, 1,114 ml of a 20% by weight HCl and 1,190 ml of a 19.7% by weight aqueous solution of a fully hydrolyzed polyvinyl alcohol, viscosity 3.68 mPas (DIN 53015; Höppler method; 4% by weight aqueous solution), were charged to a 6 liter glass reactor and cooled to −2° C. within a period of one hour, with stirring. A mixture made from 2.5 g of 3,3-diethoxypropyltriethoxysilane and 188 ml (151.6 g) of butyraldehyde, cooled in advance to −4° C., was then added over a period of 5 minutes, with an attendant rise in internal reactor temperature to −0.7° C. The mixture was then rapidly cooled again to −2° C. 3 minutes after addition of the mixture the reaction mixture, which had until then been clear, was observed to become cloudy, and the product precipitated as little as 5 minutes later. After 40 minutes reaction time at −2° C. the temperature was increased to 25° C. over a period of 3.5 hours, and this temperature was maintained for a further 2 hours. The product was then separated by suction filtration and washed with distilled water until the filtrate gave a neutral reaction. The moist product was dried to a solids content of at least 98%, initially at 22° C. and then at 35° C. in vacuo, yielding a modified polyvinyl butyral having 17.8% by weight of vinyl alcohol units, 1.5% by weight of vinyl acetate units, and 80.7% by weight of vinyl butyral units. The viscosity (DIN 53015; Höppler method; 10% by weight ethanolic solution) was 25.1 mPas. The Si content was determined to be 0.05% by weight.

EXAMPLE 4

2,698 ml distilled water and 1,332 ml of a 20.4% by weight aqueous solution of a polyvinyl alcohol with a hydrolysis index of 77.2 mg KOH/g and a viscosity of 1.87 mPas (DIN 53015; Höppler method; 4% by weight aqueous solution) were charged to a 6 liter glass reactor, and cooled to 10° C. over a period of one hour, with stirring. 21 ml of 3,3-dimethoxypropyltriisopropoxysilane were then added within a period of 10 minutes. The pH of the mixture was adjusted to 5 using about 5 ml of 20% strength hydrochloric acid, and the mixture was stirred for 20 min. 74 ml of acetaldehyde and 97 ml of butyraldehyde, cooled in advance to −4° C., were then added within a period of 5 min. The modified polyvinyl acetal was precipitated at 5° C. by adding 820 ml of a 20% strength hydrochloric acid, metered in within a period of 50 min. After 40 minutes of reaction time at 5° C., the temperature was increased to 25° C. over a period of 3.5 hours, and this temperature was maintained for a further 2 hours. The product was then separated by suction filtration and washed with distilled water until the filtrate gave a neutral reaction. The moist product was dried to a solids content of at least 98%, initially at 22° C. and then at 35° C. in vacuo, yielding a modified polyvinyl acetal having 17.7% by weight of vinyl alcohol units. The vinyl acetate content was 6.5% by weight. The viscosity (DIN 53015; Höppler method; 10% by weight ethanolic solution) was 51.9 mPas. The Si content was determined as 0.41% by weight.

Comparative Example C1

The procedure was that of Example 1, except that 190 ml of butyraldehyde were used for the acetalization, yielding a polyvinyl butyral having 17.9% by weight of vinyl alcohol units, 1.5% by weight of vinyl acetate units. The viscosity (DIN 53015; Höppler method; 10% by weight ethanolic solution) was 26.4 mPas.

Comparative Example C4

The procedure was that of Example 4, except that 100 ml of acetaldehyde and 128 ml of butyraldehyde were used for the acetalization. The initial charge comprised the polyvinyl alcohol used in Example 4, the acid, and water. The product was precipitated at 5° C. by adding the two aldehydes within a period of 5 min., ultimately yielding a polyvinyl butyral having 15.8% by weight vinyl alcohol units. The viscosity (DIN 53015; Höppler method; 10% by weight ethanolic solution) was 16.8 mPas.

Test Methods:

1. Determination of Dynamic Viscosity of a Solution of Polyvinyl Acetals (Solution Viscosity):

90.00±0.01 g of ethanol and 10.00±0.01 g of polyvinyl acetal were weighed into a 250 ml Erlenmeyer flask with ground glass stopper and fully dissolved in a shaker at 50° C., followed by cooling to 20° C. and determination of dynamic viscosity (DIN 53015; Höppler method) at 20° C. using a suitable ball, e.g. ball 3.

2. Determination of Vinyl Alcohol Content:

The content of vinyl alcohol groups in the polyvinyl acetals was determined by acetylating the hydroxyl groups with acetic anhydride in the presence of pyridine and 4-dimethylaminopyridine. For this determination, 1±0.001 g of polyvinyl acetal was dissolved in 24 ml of pyridine and 0.04 g of 4-dimethylaminopyridine at 50° C. within a period of 2 hours. The solution, cooled to 25° C., was treated with 10 ml of a mixture of pyridine and acetic anhydride (87/13 parts by volume) and intimately mixed for a period of 1 hour. 30 ml of a mixture of pyridine/water (5/1 parts by volume) were then added and the reaction mixture was shaken for a further hour. This was followed by titration to pH 7 using methanolic 0.5 N KOH. Calculation: % by weight of vinyl alcohol=[(100×$M_w$)/2000]×(ml blind value−ml specimen), where $M_w$=average molecular weight per repeat unit in the polymer.

3. Determination of Viscosity of Polyvinyl Alcohol Solutions:

The method for determining the viscosity of the partially or fully hydrolyzed silanized solid polymers used as starting materials was based on the determination of dynamic viscosity of the polyvinyl acetals; the aqueous solutions used were of only 4% strength by weight.

4. Determination of Adhesion:

a) Tesa Test:

A blister-free film is cast from the specimen to be tested (e.g. polyvinyl acetal) on a film (in some cases cleaned in advance using isopropanol and, where appropriate, corona-pretreated), and dried. For casting the film, the polyvinyl acetal is dissolved in ethanol, the concentration in each case depending on the viscosity of the solution. Beiersdorf AG Tesa 4105 film of width 15 mm is used for the test. To test bond strength, a strip of length 13 cm is applied by adhesion to the dried film which has been stored at room temperature for at least 16 h. Firm and uniform pressure from a fingernail is used to secure the applied section, while pulling one end of the Tesa film to obtain a lug for peeling. The film to be tested should have been located on a hard underlay for this process. The lug is now used to peel off the Tesa film backward at an angle of 45°. The test consists in observing the area under investigation to find whether and to what extent the film has adhered to the Tesa film and become released from the printed material. The test is carried out on a number of areas, under identical conditions. The results are graded 1 to 4, 1 being the best grade and 4 the worst.

Detailed Assessment:

1=very good adhesion (no areas of release)
2=release of the coating in isolated areas
3=release of the coating at a number of areas
4=coating does not adhere (full release)

b) Determination of Adhesion in Composite:

The adhesion of a paint or of a printing ink to the underlying material can be expressed numerically by using an instrument to measure the bond strength in the laminate. For this test, each type of film was laminated to itself. If the films were corona-pretreated prior to application of the paint, the laminate film was subjected to the same pretreatment. The laminates were produced using a laminating roll with a weight of 5 kg, and the adhesive used was a 2 c PU system (Liofol UK 3640, hardener UK 6800) from the company Henkel. This system is suitable for producing composite films from PE, PP, PET, PA, or UPVC. To produce a ready-to-use adhesive, the first adhesive component is diluted to 35% and then mixed with the hardener in a ratio of 50:1. This adhesive is applied to the film, dried for 30 s at room temperature, and laminated to the painted side (coating as in Tesa test) of another film, by passing the roller 6 times over the composite, without applying pressure. The adhesive is cured at a temperature of 60° C. for 24 h. The composite is cut into strips of width 15 mm, and bond strength is measured on tensile testing equipment from Instron. The higher the value measured, the better the adhesion in the composite. If the adhesion in the composite is very good, it is even possible for the film to tear, in which case no quantitative value is given.

Results of Application-Related Tests:

To test adhesion, the Tesa test and the determination of adhesion in the composite were carried out using the following commercially available films:

DuPont PET Melinex 800; corona pretreatment using 400 W
DuPont PET Melinex 813; untreated
OPP Mobil MB 400; untreated; (polypropylene film)
OPP Mobil MB 400; corona pretreatment using 600 W, (polypropylene film)

Results from measurements of adhesion of products from examples and comparative examples are presented in Table 1.

TABLE 1

| Example | Corona Treated PET 800 | Untreated PET 813 | Untreated OPP MB400 | Corona Treated OPP MB400 |
|---|---|---|---|---|
| 1 | 1 | 1 | 1 | 1 |
| 2 | 1 | 1 | 1 | 1 |
| 3 | 1 | 1 | 1 | 1 |
| 4 | 1 | 1 | 2 | 2 |
| C1 | 1 | 1 | 4 | 4 |
| C4 | 2 | 2 | 4 | 4 |

In the Tesa test, when the modified polyvinyl acetals of the invention are used, a marked improvement in adhesion is obtained with all of the films tested. This is confirmed by comparing Examples 1 to 3 with Comparative Example C1 and comparing Example 4 with Comparative Example C4. The better adhesion for the silane-containing polyvinyl acetals here in the Tesa test begins at even relatively low content of silicon (or alkoxysilane groups and/or free silanol groups), as Example 3 illustrates.

In the case of the DuPont PET Melinex polyester films the Tesa test does not give clear conclusions, since even the comparative samples here (standard product) exhibit very good adhesion from the outset.

Determination of adhesion in composites, as presented in Table 2, makes the differences clearer.

TABLE 2

Determination Of Adhesion In Composite; Unit: N/15 mm

| Example | Corona Treated PET 800 | Untreated PET 813 | Untreated OPP MB400 | Corona Treated OPP MB400 |
|---|---|---|---|---|
| 1 | 0.23 tF | F | 0.65 | F |
| 2 | F | F | 0.37 | 0.62 |
| 3 | F | F | 0.92 | F |
| 4 | 0.19 | 0.35 | 0.28 | 0.46 |
| C1 | 0.03 | 0.09 | 0.02 | 0.01 |
| C4 | 0.02 | 0.08 | 0.015 | 0.02 |

F = film tears, tF = some tearing of film

Use of the silane-containing polyvinyl acetals of the invention drastically increased adhesion in the composite. Comparison of Examples 1 to 3 with Comparative Example C1 shows that in the case of the polyester films (DuPont PET Melinex 800 and 813) and on some occasions in the case of corona-pretreated Mobil MB 400 OPP polypropylene film, the increase in adhesion in the composite is indeed so great that there is complete tearing of the film or some degree of tearing. The results indicate that the adhesion of the polyvinyl acetal of the invention to the substrate is even stronger than the cohesion of the film used. The good results obtained from Example 3 again confirm that even a relatively low content of silicon (or alkoxysilane groups and/or free silanol groups) can achieve excellent adhesion, in this case within the composite. Comparison of Example 4 with Comparative Example C4 shows that although a higher silicon content continues to give better adhesion than that obtained using conventional polyvinyl acetals, the adhesion is poorer than that for the polyvinyl acetals of the invention with low silicon content.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention. By the terms "vinyl alcohol units," "vinyl ester units" and like terms used with respect to polymer constituents is meant repeating moieties in the polymer which are derived from the respective monomer or, as in the case of vinyl alcohol, by a hypothetical monomer.

What is claimed is:

1. A process for preparing a silane-modified polyvinyl acetal, comprising adding one or more aldehydes, optionally in the form of a hemiacetal or acetal, to an aqueous solution of a partially hydrolyzed or fully hydrolyzed vinyl ester polymer having at least 50 mol % of vinyl alcohol units, in the presence of acidic catalysts, above a precipitation temperature of said silane modified polyvinyl acetal, and then lowering the temperature to the precipitation temperature, and carrying out the precipitation with addition of further catalyst, where at least one of said one or more aldehydes contains at least one hydrolyzable silane group.

2. The process of claim 1, wherein the at least one aldehyde containing silane groups has one of the structural formulae

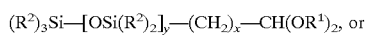   I)

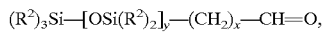   II)

where each $R^1$ independently is a hydrogen atom or an optionally branched, saturated or unsaturated, optionally substituted alkyl radical having from 1 to 12 carbon atoms optionally interrupted by N, O, or S heteroatoms, and each $R^2$ independently is a radical selected from the group consisting of halogen, $C_{1-12}$ alkyl radicals, $C_{1-12}$ alkoxy radicals, and $C_{2-12}$ acyl radicals, wherein the $C_{1-12}$ alktl, $C_{1-12}$ alkoxy, and $C_{2-12}$ acyl radicals are optionally branched, optionally substituted, optionally unsaturated, and optionally interrupted by N, O, or S heteroatoms, X is a number from 2 to 40, and Y is a number from 0 to 100.

3. The process of claim 2 wherein the silane-containing aldehyde comprises one or more compounds selected from the group consisting of 3,3-diethoxypropyltriethoxysilane, 3,3-dimethoxypropyltriethoxysilane, 3,3-diethoxypropyltrimethoxysilane, 3,3-dimethoxypropyltrimethoxysilane, 3,3-diethoxypropylmethyldiethoxysilane, 3,3-diethoxypropyldimethylethoxysilane, 3,3-dimethoxypropyltripropoxysilane, 3,3-dimethoxypropyltriisopropoxysilane, 3,3-dipropoxypropyltriethoxysilane, 3,3-diethoxypropylmethyldimethoxysilane, 3,3-diethoxypropyldimethylmethoxysilane, 3,3-dimethoxypropylmethyldimethoxysilane, 3,3-dimethoxypropyldimethylmethoxysilane, 3,3-dimethoxypropylmethyldiethoxysilane, 3-(trimethoxysilyl)propionaldehyde, 3-(triethoxysilyl)propionaldehyde, and 4-(trimethoxysilyl)butyraldehyde.

4. The process of claim 1 wherein the silane-containing aldehyde is used in mixtures with silane-free aldehydes selected from the group consisting of aliphatic and aromatic aldehydes having from 1 to 15 carbon atoms, their hemiacetals and acetals.

5. The process of claim 1 wherein the silicon content is from 0.002 to 10% by weight, based on the total weight of the silane-modified polyvinyl acetal.

6. The process of claim 1 wherein the degree of acetalization of the silane-modified polyvinyl acetal is from 1 to 80 mol %.

7. The process of claim 1 wherein the partially hydrolyzed or fully hydrolyzed vinyl ester polymers are prepared by hydrolysis of polymers which contain from 50 to 100 mol % of vinyl ester units derived from one or more vinyl esters of optionally branched carboxylic acids having from 1 to 15 carbon atoms.

8. The process of claim 1 wherein said partially hydrolyzed or fully hydrolyzed vinyl ester polymer is a vinyl ester copolymer containing at least one copolymerized comonomer selected from the group consisting of (meth)acrylic esters of alcohols having from 1 to 15 carbon atoms, olefins, dienes, vinylaromatics and vinyl halides, the proportion of these comonomers such that the proportion of vinyl ester monomer-derived units in the vinyl ester polymer is at least 50 mol %.

9. The process of claim 1 wherein, in addition to vinyl ester-derived units, the vinyl ester polymer also contains 0.02 to 20% by weight, of units derived from ethylenically unsaturated mono- or dicarboxylic acids, ethylenically unsaturated carboxamides, ethylenically unsaturated carbonitriles, mono- or diesters of fumaric acid or maleic acid, ethylenically unsaturated sulfonic acids, or salts thereof, ethylenically polyunsaturated comonomers, acrylamidoglycolic acid, methyl methylacrylamidoglycolate, N-methylolacrylamide, N-methylolmethacrylamide, allyl N-methylolcarbamate, alkyl ethers of N-methylolacrylamide, of N-methylolmethacrylamide, or of allyl N-methylolcarbamate, alkyl esters of N-methylolacrylamide, of N-methylolmethacrylamide, or of allyl N-methylolcarbamate, said weight percent based on the total weight of the vinyl ester polymer.

* * * * *

UNITED STATES PATENT AND TRADEMARK OFFICE
CERTIFICATE OF CORRECTION

PATENT NO.        : 6,756,442 B2
APPLICATION NO. : 10/217558
DATED             : June 29, 2004
INVENTOR(S)       : Kurt Stark et al.

It is certified that error appears in the above-identified patent and that said Letters Patent is hereby corrected as shown below:

Column 13, Line 34, Claim 2

Delete "alktl" and insert --alkyl--.

Signed and Sealed this

Twenty-ninth Day of May, 2007

JON W. DUDAS
*Director of the United States Patent and Trademark Office*